United States Patent
Xiang et al.

(10) Patent No.: US 11,878,265 B2
(45) Date of Patent: Jan. 23, 2024

(54) PACKING DEVICE FOR ADSORPTION DEVICE

(71) Applicant: Xi'an Thermal Power Research Institute Co., Ltd, Xi'an (CN)

(72) Inventors: Xiaofeng Xiang, Xi'an (CN); Zhichao Wang, Xi'an (CN); Xiangyu Zhang, Xi'an (CN); Yonggang Bai, Xi'an (CN); Xiaoyu Lu, Xi'an (CN); Minghao Li, Xi'an (CN); Bo Zhang, Xi'an (CN); Zhonghua Jin, Xi'an (CN); Wei Yao, Xi'an (CN)

(73) Assignee: Xi'an Thermal Power Research Institute Co., Ltd, Xi'an (CN)

( * ) Notice: Subject to any disclaimer, the term of this patent is extended or adjusted under 35 U.S.C. 154(b) by 0 days.

(21) Appl. No.: 18/330,663

(22) Filed: Jun. 7, 2023

(65) Prior Publication Data

US 2023/0390692 A1 Dec. 7, 2023

(30) Foreign Application Priority Data

Jun. 7, 2022 (CN) .......................... 202210636671.1

(51) Int. Cl.
*B01D 53/04* (2006.01)

(52) U.S. Cl.
CPC ...... *B01D 53/0407* (2013.01); *B01D 53/0438* (2013.01); *B01D 53/0446* (2013.01); *B01D 53/0462* (2013.01); *B01D 2257/504* (2013.01); *B01D 2259/4009* (2013.01); *B01D 2259/40088* (2013.01)

(58) Field of Classification Search
None
See application file for complete search history.

(56) References Cited

U.S. PATENT DOCUMENTS 6,517,613 B1 * 2/2003 Schumm .................... B01J 8/02
55/516

FOREIGN PATENT DOCUMENTS

| CN | 206295768 U | 7/2017 |
|---|---|---|
| CN | 209205257 U | 8/2019 |
| CN | 214862367 U | 11/2021 |
| DE | 698 30 110 T2 | 1/2006 |
| GB | 591 477 A | 8/1947 |

(Continued)

OTHER PUBLICATIONS

OA for CN application 202210636671.1.

(Continued)

*Primary Examiner* — Gabriel E Gitman
(74) *Attorney, Agent, or Firm* — Maginot, Moore & Beck, LLP

(57) ABSTRACT

A packing device for an adsorption device is disclosed. The packing device includes a heating support frame, a packing layer support and a plurality of packing cells. The packing layer support is horizontally extended and arranged in a length direction of the heating support frame, and grooves are alternately provided on both sides of the packing layer support. A clamping slot corresponding to each groove is provided on one side of each packing cell, the packing cell is clamped to the packing layer support through the clamping slot, and one side of the packing cell is in contact with an inner wall of the heating support frame.

6 Claims, 3 Drawing Sheets

(56) References Cited

FOREIGN PATENT DOCUMENTS

JP      S53-40695 A     4/1978
JP      2018-48803 A    3/2018

OTHER PUBLICATIONS

English translation of OA for CN application 202210636671.1.
Notice of Allowance for CN application 202210636671.1.
English translation of Notice of Allowance for CN application 202210636671.1.

* cited by examiner

PACKING DEVICE FOR ADSORPTION DEVICE

CROSS-REFERENCE TO RELATED APPLICATION

This application claims priority to and benefits of Chinese Patent Application No. 202210636671.1, filed on Jun. 7, 2022, the contents of which are incorporated herein by reference in their entireties for all purposes.

FIELD

The present disclosure relates to a technical field of carbon dioxide capture and adsorption, and more particularly to a packing device for an adsorption device.

BACKGROUND

Due to the problems of global warming and carbon emissions, carbon capture technologies have become a research hotspot while looking for ways to replace fossil fuels. Among them, one of main means is to use an adsorption method to deposit discharged carbon dioxide on a surface of an adsorbent by chemical means. When a deposition amount reaches saturation, the adsorbent is heated to above 100° C. to separate high-purity carbon dioxide. Then, the separated high-purity carbon dioxide can be reused as a nutrient for greenhouse crops, which can increase a growth rate by about 30%, or be reused as a food additive in soft drinks, etc.

SUMMARY

In an aspect, a packing device for an adsorption device includes a heating support frame, a packing layer support and a plurality of packing cells. The packing layer support is horizontally extended and arranged in a length direction of the heating support frame, and grooves are alternately provided on both sides of the packing layer support. A clamping slot corresponding to each groove is provided on one side of each packing cell, the packing cell is clamped to the packing layer support through the clamping slot, and one side of the packing cell is in contact with an inner wall of the heating support frame. Two ends of the packing cell from the clamping slot are classified into a long end and a short end, an end face of the long end is in contact with a top inner wall or a bottom inner wall of the heating support frame, and a gap exists between an end face of the short end and the bottom inner wall or the top inner wall of the heating support frame. The end face of the long end is in contact with the top inner wall of the heating support frame to form a packing cell with a long up and short down structure, the end face of the long end is in contact with the bottom inner wall of the heating support frame to form a packing cell with a short up and long down structure, and the packing cells with the long up and short down structure and the packing cells with the short up and long down structure are disposed alternately in sequence.

Preferably, a height of the packing cell is less than a height of the heating support frame.

Preferably, a thermal fluid inlet is provided at a first end of the heating support frame, and a thermal fluid outlet is provided at a second end of the heating support frame.

Preferably, a thickness of the clamping slot is greater than a thickness of the packing layer support.

Preferably, a through hole is provided in an inner wall of the clamping slot.

Preferably, a length of the groove is greater than half of a width of the packing layer support.

In the figures, 1—packing device main body, 2—packing cell, 3—heating support frame, 4—packing layer support, 5—thermal fluid vertical path, 6—housing, 7—thermal fluid inlet, 8—thermal fluid outlet, 9—thermal fluid horizontal path, 10—long up and short down packing cell, 11—short up and long down packing cell, 12—groove, 13—clamping slot, 14—gas path.

DETAILED DESCRIPTION

The principles and features of the present disclosure will be further described in detail below in conjunction with the accompanying drawings, and the embodiments given are only used to explain the present disclosure and are not intended to limit the scope of the present disclosure. It should be noted that all the accompanying drawings are in a very simplified form and are in a non-precise scale, and are used only for the purpose of conveniently and clearly assisting in the description of embodiments of the present disclosure.

It should be noted that when a component is said to be "fixed" to another component, it may be directly on another component or an intervening component may exit. When a component is considered to be "connected" to another component, it may be directly connected to another component or an intervening component may exit. When a component is considered to be "disposed" on another component, it may be directly disposed on another component or an intervening component may exit.

Unless otherwise defined, all technical and scientific terms used herein have the same meaning as commonly understood by those skilled in the art to which the present disclosure belongs. The terms used herein in the specification of the present disclosure are for the purpose of describing specific embodiments only, and are not intended to limit the present disclosure. As used herein, the term "and/or" includes any and all combinations of one or more of the relevant listed items.

The existing carbon dioxide adsorption devices still have the following technical problems. When a packing is disposed in an adsorption device, layer-by-layer stacking or stacked filling methods are often used. Such a packing method makes a residence time of adsorbed carbon dioxide gas short, which is not conducive to an efficient exchange of external heat during desorption and regeneration. Moreover, the gas material enriched on the adsorption material is not fully contacted, which will reduce an energy utilization rate and lead to a poor desorption effect at the same time.

Aiming at the problems existing in the existing technology, a packing device for an adsorption device is provided in the present disclosure, which can prolong a residence time of carbon dioxide gas, realize an efficient heat exchange, improve an energy utilization rate, and enhance a desorption effect.

Figure 1:
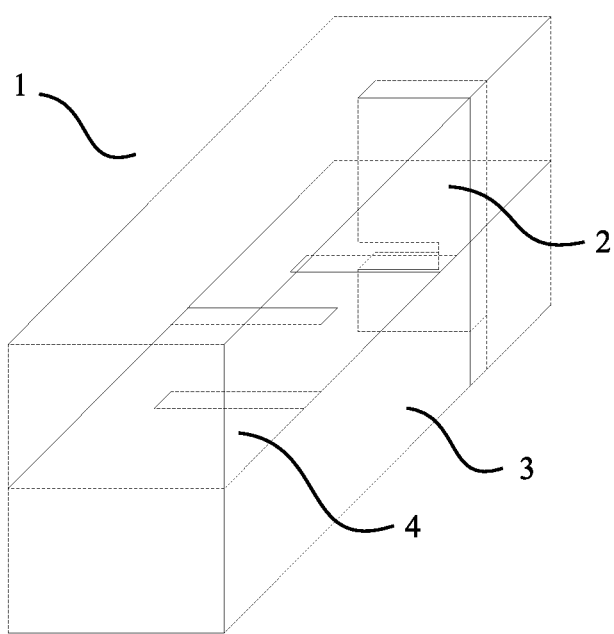
FIG. 1 is a schematic view of a packing device in an embodiment of the present disclosure.

A packing device for an adsorption device is provided in an embodiment of the present disclosure, as shown in FIG. 1, including a heating support frame 3, a packing layer support 4 and a plurality of packing cells 2.

The packing layer support 4 is horizontally extended and arranged in a length direction of the heating support frame 3, and grooves 12 are alternately provided on both sides of the packing layer support 4.

A clamping slot 13 corresponding to each groove 12 of the packing layer support 4 is provided on one side of each packing cell 2, the packing cell 2 is clamped to the packing layer support 4 through the clamping slot 13, and the other side of the packing cell 2 is in contact with an inner wall of the heating support frame 3.

The packing device for the adsorption device is provided in an embodiment of the present disclosure. The packing device is disposed inside the adsorption device. By providing the plurality of packing cells 2, sufficient or regular adsorption and desorption materials can be filled in the packing cells 2 to realize adsorption and desorption. The plurality of packing cells 2 are hung on the packing layer support 4 inside the adsorption device, disposed in a symmetrical or staggered manner to form a gas channel with a special packing structure, and combined with the heating support frame 3 disposed inside the adsorption device to introduce a thermal fluid. The thermal fluid flows through a curved gas channel to provide heat for the adsorption and desorption materials inside the packing cells 2. The arrangement form of the packing cells 2 with a special structure designed in an embodiment of the present disclosure can increase a degree of turbulence and residence time of the heat-carrying fluid, and maximize the use of heat and enable full contact with the adsorption material to achieve the purpose of improving an effect of desorption and regeneration.

Preferably, two ends of the packing cell 2 from the clamping slot 13 are classified into a long end and a short end. A length of the long end is greater than a length of the short end, an end face of the long end is in contact with a top inner wall or a bottom inner wall of the heating support frame 3, and a gap exists between an end face of the short end and the bottom inner wall or the top inner wall of the heating support frame 3.

Preferably, the end face of the long end is in contact with the top inner wall of the heating support frame 3 to form a packing cell 2 with a long up and short down structure, the end face of the long end is in contact with the bottom inner wall of the heating support frame 3 to form a packing cell 2 with a short up and long down structure, and the packing cells 2 with a long up and short down structure and the packing cells 2 with a short up and long down structure are disposed alternately in sequence. The special packing cells 2 in an embodiment of the present disclosure are disposed in a symmetrical or staggered manner inside the adsorption device, so that the short up and long down structures and the long up and short down structures are staggered to provide a vertical path for the gas flow in the adsorption device.

Furthermore, in an embodiment of the present disclosure, the special packing cells 2 are adopted, which are designed into two structural forms: a packing cell 2 with a long up and a short down structure and a packing cell 2 with a short up and a long down structure, and arranged in a symmetrical or staggered manner. Thus, the heat medium can flow in a curved path in both horizontal and vertical directions inside the adsorption device, which further increases the residence time of the thermal fluid and the degree of turbulence of the thermal fluid in both vertical and horizontal directions, so that the gas materials enriched on the adsorption material can be fully contacted. The purpose of making full use of heat for an efficient heat exchange is achieved, and the desorption of adsorbed gas molecules and the regeneration of desorbed materials are also promoted. In addition, the packing device in an embodiment of the present disclosure is simple in structure, easy to process, convenient to assemble and disassemble, and high in thermal efficiency.

Preferably, a height of the packing cell 2 is less than a height of the heating support frame 3.

A thermal fluid inlet 7 is provided at a first end of the heating support frame 3, and a thermal fluid outlet 8 is provided at a second end of the heating support frame 3. The thermal fluid starts to flow after entering the interior of the device through the thermal fluid inlet 7 at the first end, and flows through the gas channel to complete heat exchange and then flows out from the thermal fluid outlet 8 to realize adsorption and heat exchange in the whole process.

Preferably, a thickness of the clamping slot 13 is greater than a thickness of the packing layer support 4, to leave a heat exchange channel between the thermal fluid and the adsorption and desorption materials inside the packing cell 2.

Preferably, through holes are provided in an inner wall of the clamping slot 13, e.g., small holes are disposed along a flow path of the thermal fluid to provide heat for the desorption material inside the packing cell 2 to realize heat exchange.

Preferably, a length of the groove 12 is greater than half of a width of the packing layer support 4, so that a curved horizontal flow channel is formed, which increases a length and a curvature of the channel when the thermal fluid flows, thereby increasing the degree of turbulence and residence time of the heat-carrying fluid.

As shown in FIG. 1, an arrangement method of a packing device in a certain embodiment of the present disclosure is shown.

In this embodiment, a packing device main body 1 is disposed in an adsorption device main body, which plays the role of trapping and enriching low-concentration gases. A packing cell 2 with a special structure is configured as a concave structure in a middle section, that is, a clamping slot is provided on one side of the packing cell 2, in order to be stuck on a packing layer support 4 of a heating support frame 3.

Figure 3:
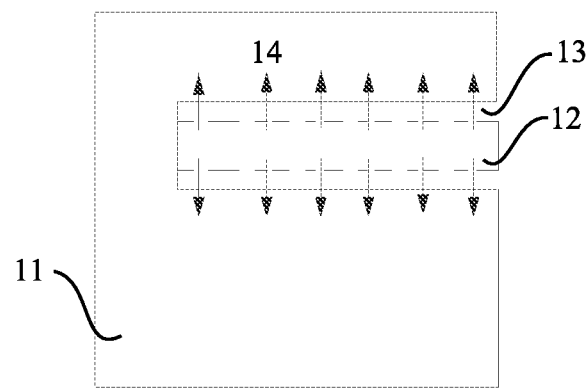
FIG. 3 is a left view of a short up and long down packing cell in an embodiment of the present disclosure.
Figure 4:
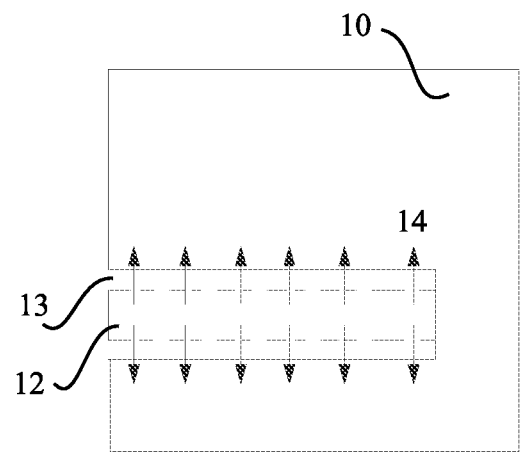
FIG. 4 is a left view of a long up and short down packing cell in an embodiment of the present disclosure.

As shown in FIG. 3 and FIG. 4, the packing cells 2 in this embodiment are classified into two forms: a short up and long down packing cell 11 and a long up and short down packing cell 10. The packing cells 2 are symmetrically arranged, and the short up and long down packing cells 11 and the long up and short down packing cells 10 are arranged alternately in sequence in order to leave a longitudinal channel for the gas, increase a degree of turbulence and residence time of the heat-carrying fluid, maximize the use of heat and enable full contact with the adsorption material to achieve the purpose of improving an effect of desorption and regeneration.

Figure 2:
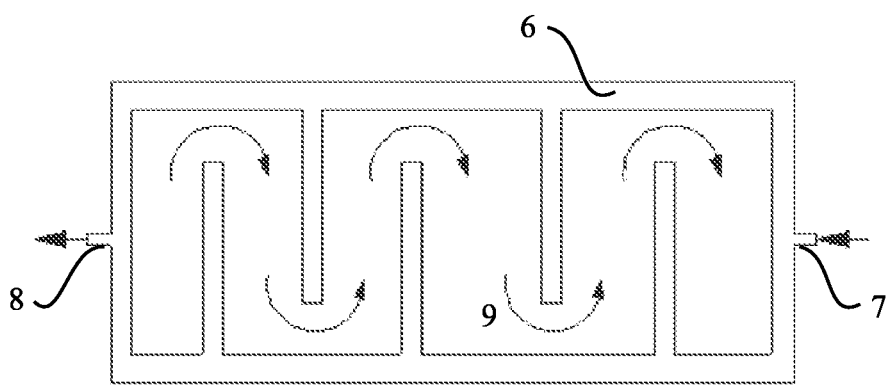
FIG. 2 is a top view of a packing device in an embodiment of the present disclosure.

As shown in FIG. 2, packing layer supports 4 are disposed in a middle section of a heating support frame 3 in a side-by-side and symmetrical manner. The thermal fluid (steam in this embodiment) enters the device by the heat medium entering from the outside of a housing 6 of the packing device via a thermal fluid inlet 7 and carrying heat.

After heat transfer is completed, the thermal fluid leaves the packing device through a thermal fluid outlet 8 to provide heat for the desorption and regeneration process of the adsorption material.

The long up and short down packing cell 10 and the short up and long down packing cell 11 are stuck on the packing layer support 4. The heat medium comes out from through holes, and fully contacts with the adsorption material packed in a packing cell 2 along a gas path 14 of the packing layer support 4 to achieve an efficient heat exchange.

Figure 5:
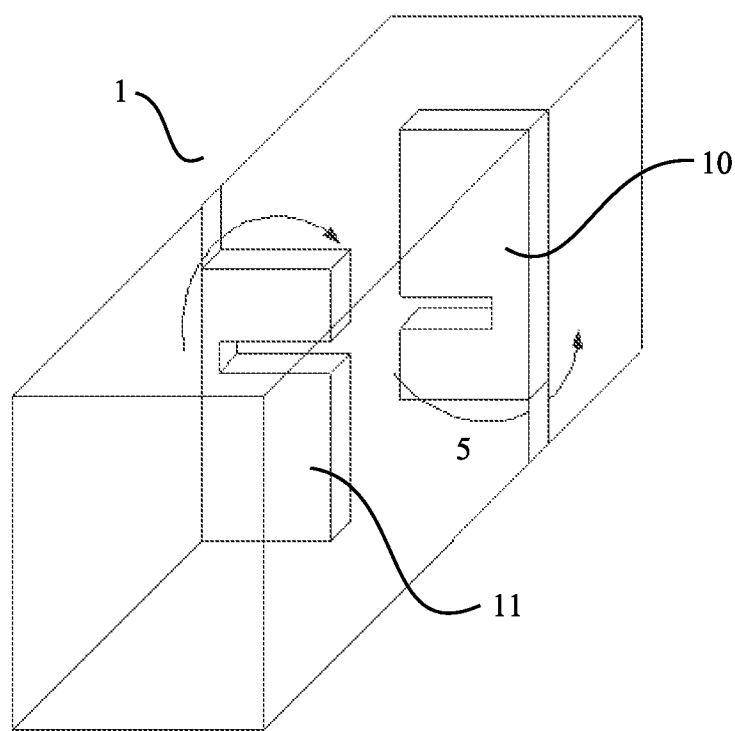
FIG. 5 is a schematic view illustrating a gas path of a packing device in an embodiment of the present disclosure.

FIG. 2 and FIG. 5 are schematic views illustrating gas paths around packing cells 2 in a horizontal direction and a vertical direction respectively. After the thermal fluid enters the adsorption device, it flows inside the adsorption device in a curved thermal fluid horizontal path 9 along the packing layer supports 4 disposed in a symmetrical or staggered manner, prolonging the residence time of the heat medium in the horizontal direction. The disposed long up and short down packing cells 10 and short up and long down packing cells 11 provide a curved channel for the heat medium in the vertical direction, making it flow along a direction of a thermal fluid vertical path 5. The degree of turbulence of the heat medium is increased inside the device in the up-down direction as well as the left-right direction, sufficient contact opportunities are provided between heat and the adsorption material, the residence time of the heat medium is increased to achieve the purpose of sufficient heat exchange, and the desorption of adsorbed gas molecules and the regeneration of the desorbed materials are promoted at the same time.

The above descriptions are only preferred embodiments of the present disclosure, and are not intended to limit the present disclosure in any form. All those skilled in the art can smoothly implement the present disclosure as shown in the accompanying drawings and illustrated in the above descriptions. However, any equivalent change, modification and evolution made by those skilled in the art without departing from the scope of the technical solution of the present disclosure by utilizing the technical content disclosed above are all equivalent embodiments of the present disclosure. At the same time, all changes, modifications and evolutions made to the above embodiments according to the substantive technology of the present disclosure are still within the scope of protection of the technical solutions of the present disclosure.

What is claimed is:

1. A packing device for an adsorption device, comprising:
   a heating support frame;
   a packing layer support horizontally extended and arranged in a length direction of the heating support frame, wherein the packing layer support has grooves on its top surface extending from each long edge of the packing layer support in an alternating fashion, such that one of said grooves extends from one long edge of the packing layer support and is located between two adjacent ones of said grooves extending from the other long edge of the packing layer support in a length direction of the packing layer support; and
   a plurality of packing cells, wherein each packing cell comprises a clamping slot on one side of the packing cell corresponding to respective groove, each packing cell is clamped to the packing layer support through its clamping slot, and another side of each packing cell is in contact with an inner wall of the heating support frame;
   wherein each of the plurality of packing cells has a long end and a short end on opposite sides of its clamping slot, an end face of each long end is in contact with a top inner wall or a bottom inner wall of the heating support frame, and a gap exists between an end face of each short end and the bottom inner wall or the top inner wall of the heating support frame;
   wherein the plurality of packing cells are each one of a packing cell with a long up and short down structure and a packing cell with a short up and long down structure, such that a respective end face of the long end in the long up and short down structure is in contact with the top inner wall of the heating support frame, and a respective end face of the long end in the short up and long down structure is in contact with the bottom inner wall of the heating support frame; and
   wherein the packing cells with the long up and short down structure and the packing cells with the short up and long down structure are disposed alternately in sequence corresponding to the grooves of the packing layer support.

2. The packing device according to claim 1, wherein a height of each packing cell is less than a height of the heating support frame.

3. The packing device according to claim 1, wherein a thermal fluid inlet is provided at a first end of the heating support frame, and a thermal fluid outlet is provided at a second end of the heating support frame.

4. The packing device according to claim 1, wherein a thickness of each clamping slot is greater than a thickness of the packing layer support.

5. The packing device according to claim 1, wherein a through hole is provided in an inner wall of each clamping slot.

6. The packing device according to claim 1, wherein a length of each groove is greater than half of a width of the packing layer support.

* * * * *